United States Patent
Scales

(10) Patent No.: US 6,567,895 B2
(45) Date of Patent: May 20, 2003

(54) LOOP CACHE MEMORY AND CACHE CONTROLLER FOR PIPELINED MICROPROCESSORS

(75) Inventor: Richard H. Scales, Houston, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/855,140

(22) Filed: May 14, 2001

(65) Prior Publication Data

US 2002/0016887 A1 Feb. 7, 2002

Related U.S. Application Data

(60) Provisional application No. 60/208,508, filed on May 31, 2000.

(51) Int. Cl.[7] .............................. G06F 9/40; G06F 9/38
(52) U.S. Cl. ......................... 711/140; 712/215; 712/241
(58) Field of Search ................................ 711/140, 118, 711/125; 712/215, 241

(56) References Cited

U.S. PATENT DOCUMENTS

| 5,893,142 A | * | 4/1999 | Moyer et al. ................ 711/125 |
| 5,951,679 A | * | 9/1999 | Anderson et al. ............ 712/241 |
| 6,076,159 A | * | 6/2000 | Fleck et al. .................. 712/213 |

OTHER PUBLICATIONS

Bajwa et al., "Instruction Buffering to Reduce Power in Processors for Signal Processing", IEEE Trans. on VLSI Systems, vol. 5 No. 4, Dec. 1997 pp. 417–424.*

Lee et al., "Instruction fetch energy reduction using loop caches for embedded applications with small tight loops", Proc 1999 Intl Symp on Low power electronics and design, pp. 267–269.*

Texas Instruments *TMS320C62xx CPU and Instruction Set Reference Guide*, © 1997.

ACM Computing Surveys, vol. 27, No. 3, Sep., 1995, "Software Pipelining", Vicki H. Allan et al.

* cited by examiner

*Primary Examiner*—Reginald G. Bragdon
*Assistant Examiner*—Paul Baker
(74) *Attorney, Agent, or Firm*—William W. Holloway; W. James Brady; Frederick J. Telecky, Jr.

(57) ABSTRACT

A microprocessor and method for operating this microprocessor are disclosed. The microprocessor contains multiple execution units that receive instructions from an instruction pipeline. A loop cache memory is connected in communication with the instruction pipeline, such that it may both store instructions from the instruction pipeline and issue instructions to be executed by the execution units. A loop cache controller controls instruction flow. In operation, the loop cache controller is preferably signaled by a software instruction to begin building a software pipelined loop of a specified size into the loop cache memory. The loop cache controller then begins accumulating instructions from the instruction pipeline into the loop cache memory; these instructions may also remain in the pipeline for execution. When the kernel of the software pipelined loop is built into the loop cache memory, the controller preferably stalls the instruction pipeline and executes the loop using the cached instructions. Upon loop completion, the instruction pipeline is resumed. The present invention reduces the code size required for software pipelined loops by building the loop kernel into the loop cache memory, thus eliminating repetitive instructions generally required to fill a software pipeline. The invention further allows power consumption to be reduced during loop execution as loop instructions need not be retrieved repetitively from standard cache or off-chip memory.

9 Claims, 13 Drawing Sheets

FIG. 5a
(PRIOR ART)

C6000 Pipeline Stages

- PG (fetch packet – 8 instructions)
- PS (fetch packet – 8 instructions)
- PW (fetch packet – 8 instructions)
- PR (fetch packet – 8 instructions)
- DP (8 instructions reside in dispatch waiting to be sent to DC)
  (Each group of 8 instructions contain 1–8 execute packets)
  (1 execute packet sent to DC each cycle)
  (Next PR result is loaded after all executes packets are sent)
- DC (8 individual decode units for each of 8 functional units)
- E1 (Execute begins on each of the 8 functional units)

| Cycle | PG | PS | PW | PR | DP | DC | E1 |
|---|---|---|---|---|---|---|---|
| 0 | A | | | | | | |
| 1 | B | A | | | | | |
| 2 | C | B | A | | | | |
| 3 | D | C | B | A | | | |
| 4 | E | D | C | B | A | | |
| 5 | | E | D | C | B | A | |
| 6 | | | E | D | C | B | A |
| 7 | | | | E | D | C | B |
| 8 | | | | | E | D | C |
| 9 | | | | | | E | D |
| 10 | | | | | | | E |

FIG. 7 (PRIOR ART)

| Cycle | |
|---|---|
| 0 | A1 |
| 1 | B1 |
| 2 | C1 |
| 3 | D1 |
| 4 | E1 |
| 5 | A2 |
| 6 | B2 |
| 7 | C2 |
| 8 | D2 |
| 9 | E2 |
| ⋮ | ⋮ |
| 95 | A20 |
| 96 | B20 |
| 97 | C20 |
| 98 | D20 |
| 99 | E20 |

| PIPELINE PHASE | SYMBOL | DURING THIS ENTIRE PHASE | BY THE END OF THIS PHASE |
|---|---|---|---|
| PROGRAM ADDRESS GENERATE | PG | | ▫ EXCEPT WHEN A PROGRAM STORE IS IN E1, PFC AND PADDR ARE LATCHED TO THEIR NEXT VALUES: EITHER THE NEXT 8-WORD BOUNDARY AFTER THE CURRENT PFC OR A BRANCH TARGET ADDRESS.<br>▫ WHEN A PROGRAM STORE IS IN E1, THE PFC REMAINS UNCHANGED AND PADDR TAKES THE VALUE FROM THE PROGRAM STORE INSTRUCTION. |
| PROGRAM ADDRESS SEND | PS | ▫ PFC VALID ON PADDR.<br>▫ IF A FETCH PACKET FETCH NEEDED, PRS SET ACTIVE. | ▫ IF PRS ACTIVE, PMS LATCHES PADDR. |
| PROGRAM WAIT | PW | ▫ IF THE FETCH PACKET INDICATED BY THE LAST PRS IS NECESSARY, PDS IS ASSERTED. | ▫ IF PDS IS ASSERTED, PMS LATCHES THE LAST REQUESTED FETCH PACKET TO BE DRIVEN DURING PR. |
| PROGRAM DATA RECEIVE | PR | ▫ IF PDS ACTIVE DURING THE ASSOCIATED PW, PMS DRIVES REQUESTED FETCH PACKET ONTO PDATA_1. OTHERWISE THE PREVIOUS FETCH PACKET DRIVEN ON TO PDATA_1 IS MAINTAINED. | ▫ IF IT CAN BE DETERMINED THAT THE FETCH PACKET REQUESTED BY AN ACTIVE PDS IN PW IS NEEDED, CPU LATCHES THIS FETCH PACKET ON PDATA_1. OTHERWISE, THIS LATCH MAINTAINS STATE. |
| DISPATCH | DP | | ▫ PARALLELISM OF THE FETCH PACKET DETECTED.<br>▫ INSTRUCTIONS IN THE NEXT REQUESTED EXECUTE PACKET IN THE FETCH PACKET DISPATCHED TO THE APPROPRIATE FUNCTIONAL UNITS.<br>▫ DETECTION OF THE SOFTWARE BREAKPOINT CODE IN THE CREG FIELD DETECTED.<br>▫ MULTI-CYCLE NOP, NOP, SWI, AND IDLE DECODED BECAUSE THEY ARE NOT PASSED TO INDIVIDUAL FUNCTIONAL UNITS.<br>▫ PC OF THE EXECUTE PACKET IN DP LATCHED AT THE END OF THE CYCLE AS PCDC. |
| DECODE | DC | ▫ PCDC VALID. | ▫ CONTROL SIGNALS FOR ACTIONS DURING EXECUTE DECODED. |

FIG. 5b (PRIOR ART)

| PIPELINE PHASE | SYMBOL | DURING THIS PHASE | BY THE END OF THIS PHASE | CPU HAS COMPLETED TYPES |
|---|---|---|---|---|
| EXECUTE 1 | E1 | □ ALL TYPES: REGISTERS READ. | □ TYPE ISS: RESULTS WRITTEN TO THE REGISTER FILE.<br>□ TYPE ISS: STATUS WRITTEN TO THE CONTROL REGISTER FILE.<br>□ TYPE LD AND ST: ADDRESS MODIFICATIONS WRITTEN TO THE REGISTER FILE.<br>□ TYPE LD AND ST: DADDR, DBS, AND DRNW LATCHED FOR NEXT PHASE.<br>□ TYPE ST: DDATA_0 LATCHED FOR NEXT PHASE.<br>□ TYPE BRANCH: PFC AND PADDR LATCHES THE TARGET ADDRESS.<br>□ TYPE STP: PADDR LATCHES THE DESTINATION ADDRESS IF NO FETCH IS PENDING. PWS LATCHED AS ACTIVE FOR NEXT PHASE.<br>□ TYPES LD, ST, STP, IMPY: INTERMEDIATE STATES LATCHED. | □ ISC.<br>□ BR. |
| EXECUTE 2 | E2 | □ TYPES LD AND ST: DBS ACTIVE AND DADDR VALID.<br>□ TYPE LD: DRNW ACTIVE.<br>□ TYPE ST: DRNW INACTIVE AND DDATA_0 VALID. | □ TYPE IMPY: RESULTS WRITTEN TO THE REGISTER FILE.³<br>□ TYPE IMPY: STATUS WRITTEN TO THE CONTROL REGISTER FILE.<br>□ TYPES LD AND ST: DMS LATCHES ADDR.<br>□ TYPE ST: DMS LATCHES DDATA_0.<br>□ TYPE STP: PMS LATCHES PDATA_0.<br>□ TYPE LD: INTERMEDIATE STATES LATCHED. | □ IMPY.<br>□ STD.<br>□ STP. |
| EXECUTE 3 | E3 | | □ TYPE LD: DMS LATCHES DATA REQUESTED DURING THE LAST CYCLE.<br>□ TYPES LD: INTERMEDIATE STATES LATCHED. | |
| EXECUTE 4 | E4 | □ TYPE LD: DMS DRIVES ON DDATA_1 DATA REQUESTED DURING ASSOCIATED E2. | □ TYPE LD: DDATA_1 LATCHED.<br>□ TYPES LD: INTERMEDIATE STATES LATCHED. | |
| EXECUTE 5 | E5 | | □ TYPE LD: DDATA_1 RIGHT-ALIGNED, EITHER SIGN-EXTENDED OR ZERO-FILLED, AND WRITTEN TO THE REGISTER FILE. | □ LD. |

```
Loop:   /* loops 20 times */
    A
    B
    C
    D
    E
        /* end of loop */ cycle
  0         A1
  1         B1      A2                                      /* Loop Prolog */
  2         C1      B2      A3
  3         D1      C2      B3      A4
  4,5,6...19 E1-16  D2-17   C3-18   B4-19   A5-20           /* Loop Kernel */
  20                E17     D18     C19     B20
  21                        E18     D19     C20
  22                                E19     D20             /* Loop Epilog */
  23                                        E20
```

FIG. 9 (PRIOR ART)

```
cycle                                                       /*---------*/
  0       A1                                                /*         */
  1       B1C1                                              /* Loop Prolog */
  2       D1E1                                              /*         */
  3       F1G1H1      A2                                    /*         */
  4       I1          B2C2                                  /*         */
  5       J1          D2E2                                  /*---------*/
  6, 9..57 K1-18L1-18 F2-19G2-19H2-19 A3-20                 /*---------*/
  7,10..58 M1-18N1-18 I2-19           B3-20C3-20            /* Loop Kernel */
  8,11..59 O1-18P1-18 J2-19           D3-20E3-20            /*---------*/
  60                  K19L19          F20G20H20             /*---------*/
  61                  M19N19          I20                   /*         */
  62                  O19P19          J20                   /* Loop Epilog */
  63                                  K20L20                /*         */
  64                                  M20N20                /*         */
  65                                  O20P20                /*---------*/
```

FIG. 10 (PRIOR ART)

| Loop Cycle | D1 | D2 | L1 | L2 | S1 | S2 | M1 | M2 |
|---|---|---|---|---|---|---|---|---|
| 0 | K | L |   | F | G | H | A |   |
| 1 | M |   | N | I |   | B |   | C |
| 2 |   | O | P | J |   | D |   | E |

```
LoopC6000:
    A
   ||B
   ||C
    |D
   ||E
    |F
   ||G
   ||H
   ||A ;iter2

|I
   ||B ;iter2
   ||C ;iter2

|J
   ||D ;iter2
   ||E ;iter2

/*begin loop kernel*/
    K
   ||L
   ||F ;iter2
   ||G ;iter2
   ||H ;iter2
   ||A ;iter3

M
   ||N
   ||I ;iter2
   ||B ;iter3
   ||C ;iter3

O
   ||P
   ||J ;iter2
   ||D ;iter3
   ||E ;iter3
/*end loop kernel*/

/*Loop epilog pipedown*/
    K
   ||L
   ||F
   ||G
   ||H

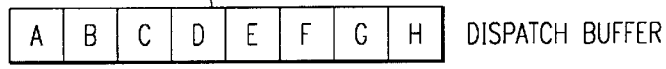

ONE EXECUTE PACKET SENT PER CYCLE
CYCLE −2 A SENT
CYCLE −1 B AND C SENT
CYCLE  0 D AND E SENT
CYCLE  1 F, G AND H SENT → NEW BUFFER LOADED W/I-P
CYCLE  2 I SENT
CYCLE  3 J SENT
CYCLE  4 K AND L SENT
CYCLE  5 M AND N SENT
CYCLE  6 O AND P SENT

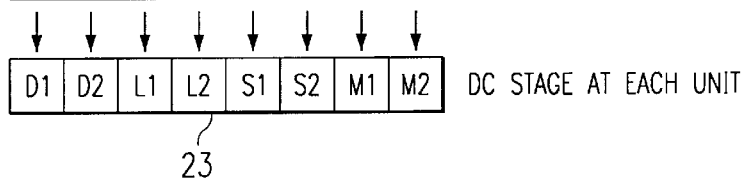

DC STAGE AT EACH UNIT

FIG. 13 (PRIOR ART)

| CYCLE | PG | PS | PW | PR | DP | DC | E1 |
|---|---|---|---|---|---|---|---|
| −6 | ABCDEFGH | | | | | | |
| −5 | IJKLMNOP | ABCDEFGH | | | 22 | 23 | |
| −4 | | IJKLMNOP | ABCDEFGH | | | | |
| −3 | | | IJKLMNOP | ABCDEFGH | | | |
| −2 | | | | IJKLMNOP | ABCDEFGH | | |
| −1 | | | | | ⋮ | A | |
| 0 | | | | | (DP-STALL) | BC | A |
| 1 | | | | | ⋮ | DE | BC |
| 2 | | | | | IJKLMNOP | FGH | DE |
| 3 | | | | | | I | FGH |
| 4 | | | | | | J | I |
| 5 | | | | | | KL | J |
| 6 | | | | | | MN | KL |
| 7 | | | | | | OP | MN |
| 8 | | | | | | | OP |

```
[cntr] B_Loop LoopNew,9,3

LoopNew:
         A
         B
      ||C
         D
      ||E
         F
      ||G
      ||H
         I
         J /*begin loop kernel*/
         K
      ||L
         M
      ||N
         O
      ||P
/*end loop kernel*/

/* instructions after the loop */
         Q
      ||R
         S
      ||T
      ||U
      ||V
         W
      ||X
```

FIG. 16a
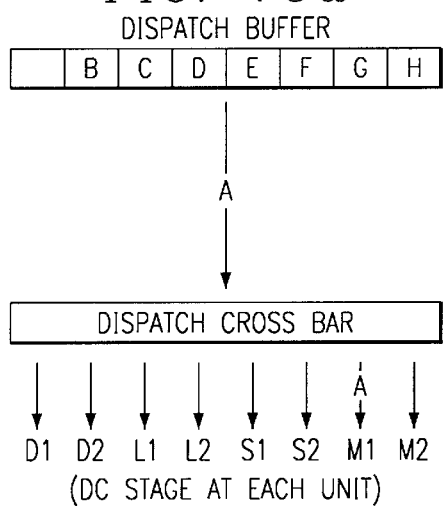
FIG. 16b
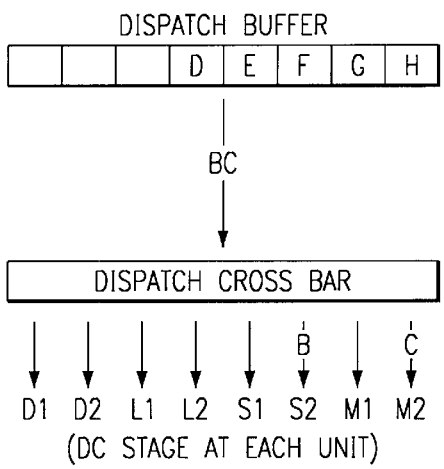
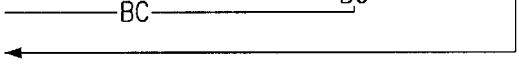
FIG. 16c
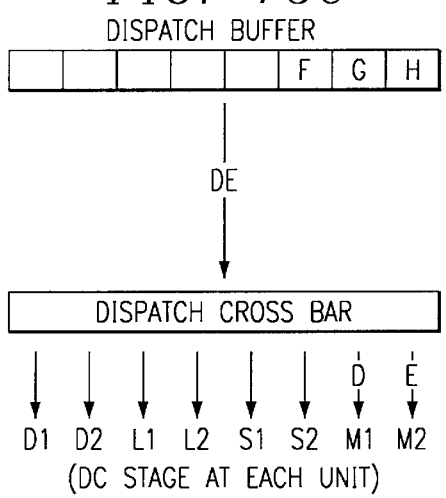
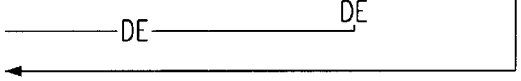

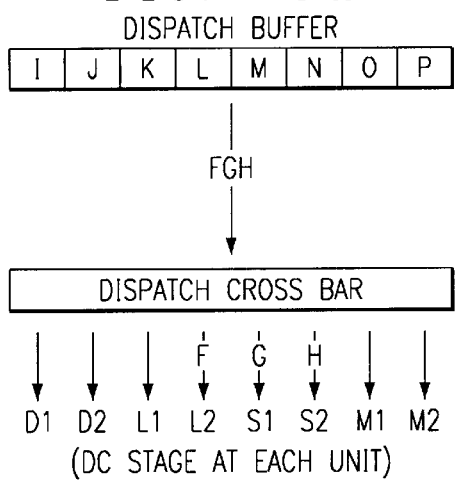
FIG. 16d
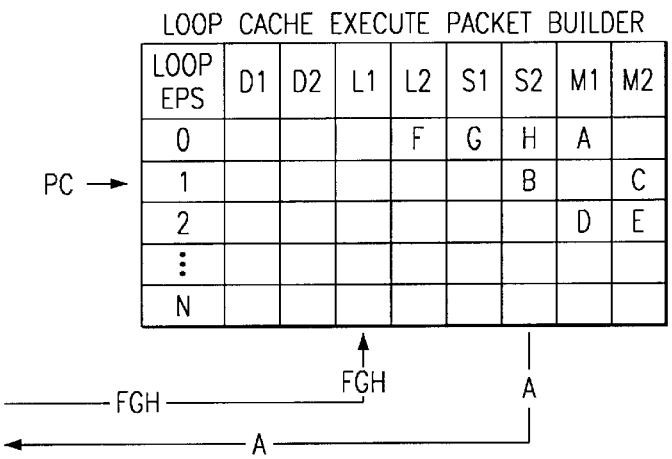
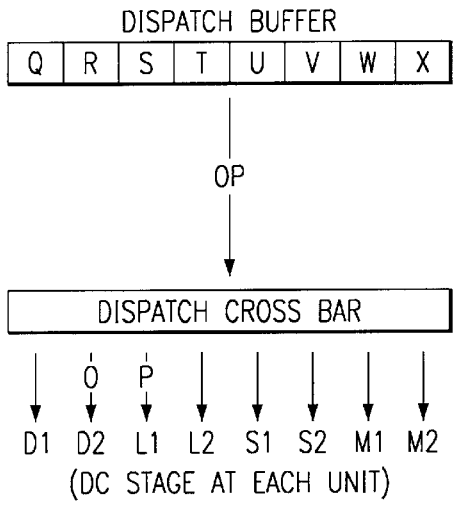
FIG. 16e
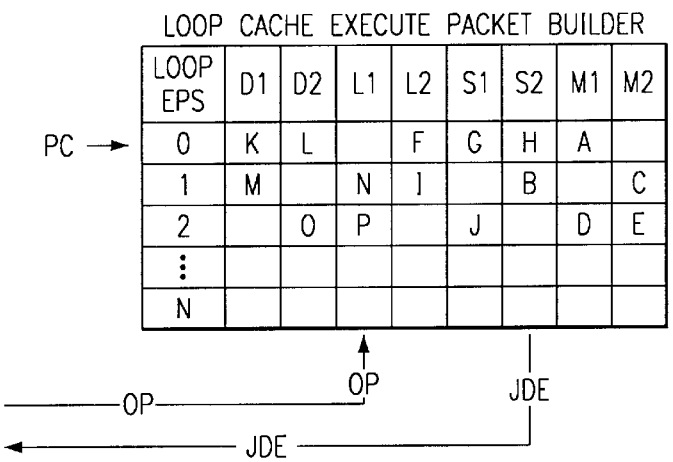
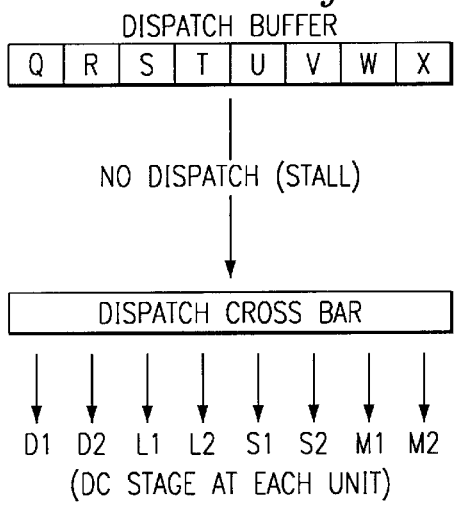
FIG. 16f
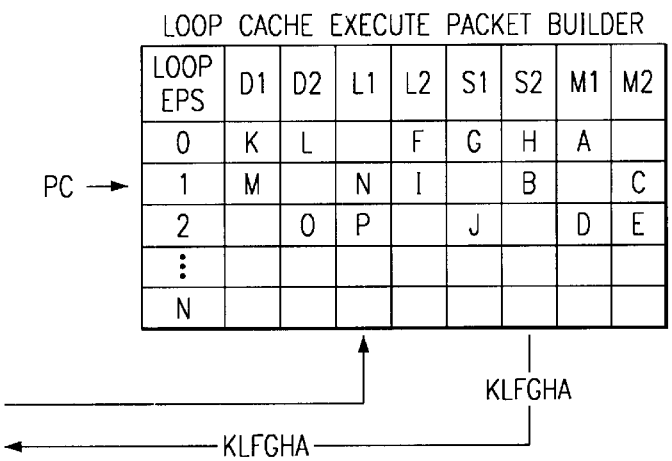

…

LOOP CACHE MEMORY AND CACHE CONTROLLER FOR PIPELINED MICROPROCESSORS

This application claims priority under 35 USC §119 (e) (1) of Provisional Application No. 60/208,508, filed May 31, 2000.

FIELD OF THE INVENTION

The present invention pertains generally to pipelined microprocessors, and pertains more particularly to methods and microprocessor structures for executing software pipelined loops.

BACKGROUND OF THE INVENTION

A microprocessor is a circuit that combines the instruction-handling, arithmetic, and logical operations of a computer on a single chip. A digital signal processor (DSP) is a microprocessor optimized to handle large volumes of data efficiently. Such processors are central to the operation of many of today's electronic products, such as high-speed modems, high-density disk drives, digital cellular phones, and complex automotive systems, and will enable a wide variety of other digital systems in the future. The demands placed upon DSPs in these environments continue to grow as consumers seek increased performance from their digital products.

Designers have succeeded in increasing the performance of DSPs generally by increasing clock frequencies, by removing architectural bottlenecks in DSP circuit design, by incorporating multiple execution units on a single processor circuit, and by developing optimizing compilers that schedule operations to be executed by the processor in an efficient manner. As further increases in clock frequency become more difficult to achieve, designers have embraced the multiple execution unit processor as a means of achieving enhanced DSP performance. For example, FIG. 1 shows a block diagram of a DSP execution unit and register structure. having eight execution units, L1, S1, M1, D1, L2, S2, M2, and D2. These execution units operate in parallel to perform multiple operations, such as addition, multiplication, addressing, logic functions, and data storage and retrieval, simultaneously.

Theoretically, the performance of a multiple execution unit processor is proportional to the number of execution units available. However, utilization of this performance advantage depends on the efficient scheduling of operations such that most of the execution units have a task to perform each clock cycle. Efficient scheduling is particularly important for looped instructions, since in a typical runtime application the processor will spend the majority of its time in loop execution.

Traditionally, the compiler is the piece of software that performs the scheduling operations. The compiler is the piece of software that translates source code, such as C, BASIC, or FORTRAN, into a binary image that actually runs on a machine. Typically the compiler consists of multiple distinct phases. One phase is referred to as the front end, and is responsible for checking the syntactic correctness of the source code. If the compiler is a C compiler, it is necessary to make sure that the code is legal C code. There is also a code generation phase, and the interface between the front-end and the code generator is a high level intermediate representation. The high level intermediate representation is a more refined series of instructions that need to be carried out. For instance, a loop might be coded at the source level as: for(I=0,1<10,1=1+1), which might in fact be broken down into a series of steps, e.g. each time through the loop, first load up I and check it against 10 to decide whether to execute the next iteration.

A code generator of the code generator phase takes this high level intermediate representation and transforms it into a low level intermediate representation. This is closer to the actual instructions that the computer understands. An optimizer component of a compiler must preserve the program semantics (i.e. the meaning of the instructions that are translated from source code to an high level intermediate representation, and thence to a low level intermediate representation and ultimately an executable file), but rewrites or transforms the code in a way that allows the computer to execute an equivalent set of instructions in less time.

Source programs translated into machine code by compilers consists of loops, e.g. DO loops, FOR loops, and WHILE loops. Optimizing the compilation of such loops can have a major effect on the run time performance of the program generated by the compiler. In some cases, a significant amount of time is spent doing such bookkeeping functions as loop iteration and branching, as opposed to the computations that are performed within the loop itself. These loops often implement scientific applications that manipulate large arrays and data instructions, and run on high speed processors. This is particularly true on modern processors, such as RISC architecture machines. The design of these processors is such that in general the arithmetic operations operate a lot faster than memory fetch operations. This mismatch between processor and memory speed is a very significant factor in limiting the performance of microprocessors. Also, branch instructions, both conditional and unconditional, have an increasing effect on the performance of programs. This is because most modern architectures are super-pipelined and have some sort of a branch prediction algorithm implemented. The aggressive pipelining makes the branch misprediction penalty very high. Arithmetic instructions are interregister instructions that can execute quickly, while the branch instructions, because of mispredictions, and memory instructions such as loads and stores, because of slower memory speeds, can take a longer time to execute.

One effective way in which looped instructions can be arranged to take advantage of multiple execution units is with a software pipelined loop. In a conventional scalar loop, all instructions execute for a single iteration before any instructions execute for following iterations. In a software pipelined loop, the order of operations is rescheduled such that one or more iterations of the original loop begin execution before the preceding iteration has finished. Referring to FIG. 7, a simple scalar loop containing 20 iterations of the loop of instructions A, B, C, D and E is shown. FIG. 8 depicts an alternative execution schedule for the loop of FIG. 7, where a new iteration of the original loop is begun each clock cycle. For clock cycles $I_4$–$I_{19}$ in the same instruction ($A_n$, $B_{n-1}$, $C_{n-2}$, $D_{n-3}$, $E_{n-4}$) is executed each clock cycle in this schedule; If multiple execution units are available to execute these operations in parallel, the code can be restructured to perform this repeated instruction in a loop. The repeating pattern of A,B,C,D,E (along with loop control operations) thus forms the loop kernel of a new, software pipelined loop that executes the instructions at clock cycles $I_4$–$I_{19}$ in 16 loops. The instructions executed at clock cycles I, through 13 of FIG. 8 must still be executed first in order to properly "fill" the software pipelined loop; these instructions are referred to as the loop prolog. Likewise, the instructions executed at clock cycles 120 and 123 of FIG. 8 must still be executed in order to properly "drain" the software pipeline; these instructions are referred to as the loop epilog (note that in many situations the loop epilog may be deleted through a technique known as speculative execution).

The simple example of FIGS. 7 and 8 illustrates the basic principles of software pipelining, but other considerations such as dependencies and conflicts may constrain a particular scheduling solution. For an explanation of software pipelining in more detail, see Vicki H. Allan, *Software Pipelining*, 27 ACM Computing Surveys 367 (1995).

One disadvantage of software pipelining is the need for a specialized loop prolog for each loop. The loop prolog explicitly sequences the initiation of the first several iterations of a pipeline, until the steady-state loop kernel can be entered (this is commonly called "filling" the pipeline). Steady-state operation is achieved only after every instruction in the loop kernel will have valid operands if the kernel is executed. As a rule of thumb, the loop kernel can be executed in steady state after k=I−m clock cycles, where I represents the number of clock cycles required to complete one iteration of the pipelined loop, and m represents the number of clock cycles contained in one iteration of the loop kernel (this formula must generally be modified if the kernel is unrolled).

Given this relationship, it can be appreciated that as the cumulative pipeline delay required by a single iteration of a pipelined loop increases, corresponding increases in loop prolog length are usually observed. In some cases, the loop prolog code required to fill the pipeline may be several times the size of the loop kernel code. As code size can be a determining factor in execution speed (shorter programs can generally use on-chip program memory to a greater extent than longer programs), long loop prologs can be detrimental to program execution speed. An additional disadvantage of longer code is increased power consumption-memory fetching generally requires far more power than CPU core operation.

One solution to the problem of long loop prologs is to "prime" the loop. That is, to remove the prologue and execute the loop more times. To do this, certain instructions such as stores, should not execute the first few times the loop is executed, but instead execute the last time the loop is executed. This could be accomplished by making those instructions conditional and allocating a new counter for every group of instructions that should begin executing on each particular loop iteration. This, however, adds instructions for the decrement of each new loop counter which could cause lower loop performance. It also adds code size and extra register pressure on both general purpose registers and conditional registers. Because of these problems, priming a software pipelined loop is not always possible or desirable.

SUMMARY OF THE INVENTION

The present invention seeks to reduce code size, power consumption, and processing delays by eliminating at least a portion of the pre-compiled loop prolog and loop kernel code required by prior art software pipelining. The present invention eliminates explicit repetitive loop prolog instructions by "compiling" or "building" the loop kernel on the fly, while at the same time executing prolog instructions in a looped fashion. A microprocessor according to the present invention thus comprises hardware that can accomplish this "building" function while looping through and executing previously issued instructions.

In one aspect, the present invention provides a multiple execution unit microprocessor comprising an instruction pipeline, a loop cache memory in communication with the instruction pipeline, and a loop cache controller. The instruction loop cache memory is capable of storing and retrieving up to N cycles of execution unit instructions for each execution unit. The loop cache memory is capable of selectively issuing instructions to the execution units from the instruction pipeline and from the loop cache memory. The loop cache controller preferably enables the instruction loop cache memory in response to a software command, and controls storage and retrieval of instructions from the loop cache. The controller preferably also detects exit conditions for the cached loop. It is also preferable that the controller function uses the microprocessor program counter. The controller may also stall and restart the instruction pipeline of the microprocessor appropriately in response to loop caching commands.

In another aspect, the present invention provides a method for operating a multiple execution unit processor having a loop cache memory and an instruction pipeline. The method comprises the steps of building a software pipelined loop kernel in the loop cache memory, stalling the instruction pipeline, executing at least one iteration of the loop kernel using the kernel instructions in the loop cache memory, detecting a loop exit condition, and resuming the instruction pipeline. Preferably, instructions may be issued from the loop cache memory while the loop kernel is being built, thus allowing reductions in code size.

One advantage of the current invention is the power saved in that less stored values are pulled from memory.

A second advantage of the current invention is the power saved in that when memory loads are made, they are made from a cache not from memory.

A third advantage of the current invention is the reduction in the amount of code necessary to effect the loop instructions.

BRIEF DESCRIPTION OF THE DRAWINGS

The invention may be best understood with reference to the drawings, wherein:

FIG. 5A illustrates the C6000 pipeline stages on which the current invention is manifested as an illustration.

FIG. 5B is a chart which illustrates the processing phases of an instruction execution pipeline in the C6x microprocessor of FIG. 1;

FIG. 5B is a chart which illustrates the processing phases of an instruction execution pipeline in the C6x microprocessor of FIG. 1.

FIG. 6 illustrates the Hardware Pipeline for a sequence of 5 instructions executed serially.

FIG. 7 illustrates the same 5 instructions executed in a single cycle loop with 20 iterations with serial execution, no parallelism and no software pipelining.

FIG. 8 illustrates the same 5 instructions executed in a loop with 20 iterations with software pipelining.

FIG. 9 illustrates instruction A–P in a loop executed in a three cycle loop with 20 iterations with software pipelining.

FIG. 10 illustrates the 3 cycle loop kernel of FIG. 9, with instructions A–P mapped to hardware functional units.

FIG. 11 illustrates the C6000 coded instruction sequence of instructions AP executed in a three cycle loop with 20 iterations with software pipelining.

FIG. 12 illustrates the dispatch of instructions A–P from the DP stage of the C6000 DP/DC stages of the C6000 pipeline.

FIG. 13 illustrates the C6000 pipeline filled with the same example of one iteration of a software pipelined loop of instructions A–P executed in a three cycle loop.

FIGS. 16a–16f illustrates a walk-through example of the operation of the Loop Cache Execute Packet Builder as viewed with regards the DP/DC stages of C6000.

FIG. 16a illustrates the Loop Cache and the decode units upon issuance of instruction A to both the C6000 CPU's M1 unit decode unit and to PC0 of the LCEPB during cycle –2.

FIG. 16b illustrates the Loop Cache and the decode units upon issuance of instructions B and C to both the C6000 CPU's S2 and M2 decode units, respectively, and to PC1 of the LCEPB during cycle –1.

FIG. 16c illustrates the Loop Cache and the decode units upon issuance of instructions D and E to both the C6000 CPU's M1 and M2 decode units, respectively, and to PC2 of the LCEPB during cycle 0.

FIG. 16d illustrates the Loop Cache and the decode units upon issuance of instructions FGH to the C6000 CPU's L2, S1 and S2 decode units, respectively, and to PC0 of the LCEPB and issuance of instruction A from PC0 of the LCEPB to the C6000 CPU's M1 decode unit, during cycle 1.

FIG. 16e illustrates the Loop Cache and the decode units upon issuance of instructions O and P to the C6000 CPU's D2 and L1 decode units, respectively, and to PC2 of the LCEPB and issuance of instructions ME from PC2 of the LCEPB to the C6000 CPU's S1, M1 and M2 decode units, respectively.

FIG. 16f illustrates the Loop Cache and the decode units upon issuance of instructions KLFGHA from PC0 of the LCEPB to the C6000 CPU's D1, D2, L2, S1, S2 and M1 decode units, respectively, while the dispatch of instructions from the DP phase of the C6000 is stalled until "cntr"=0.

DETAILED DESCRIPTION OF THE PREFERRED EMBODIMENTS

Several illustrative embodiments are described herein for the present invention. Although it is believed that the present invention may be utilized in conjunction with virtually any processor having multiple execution units, for illustrative purposes the detailed embodiments are described with reference to a specific processor family, the Texas Instruments TMS320C62xx. Those of ordinary skill in the pertinent art should comprehend the description below in sufficient detail to enable them to reproduce the invention; however, for specific data related to processor architecture, instruction set, and operation, the interested reader is referred to the Texas Instruments TMS320C62xx CPU and Instruction Set Reference Guide (1997) and the Texas Instruments TMS320C62xx Programmer's Guide (1997), which are incorporated herein by reference.

Several definitions should also be useful to the reader. As used herein, an instruction is a function performable by an execution unit on a processor in one or more clock cycles. An execute packet is a set of one or more instructions that will be dispatched to the execution units during the same clock cycle. A fetch packet is a standard-sized block of instructions, comprising one or more execute packets, that is loaded into the CPU as a single unit.

A memory-mapped on-chip memory occupies a contiguous section of regularly addressable program memory. A cache on-chip memory contains a copy of instructions that also reside in external memory and that have been previously requested (usually those most recently requested) by the CPU. These do not necessarily represent a contiguous section of program memory, and are not generally explicitly addressable by the CPU. A loop cache memory has the additional property that it may contain, at any given time when it is operational, a copy of execute packets that reside nowhere in either a conventional cache or off-chip memory. These execute packets are, however, constructed using instructions residing in a conventional cache or off-chip memory.

The Texas Instruments TMS320C6x (C6x) processor family comprises several embodiments of a processor that may be modified advantageously to incorporate the present invention. The C6x family includes both scalar and floating-point architectures. The CPU core of these processors contains eight execution units, each of which requires a 31-bit instruction. If all eight execution units of a processor are issued an instruction for a given clock cycle, the maximum instruction word length of 256 bits (8 31-bit instructions plus 8 bits indicating parallel sequencing) is required.

Figure 1:
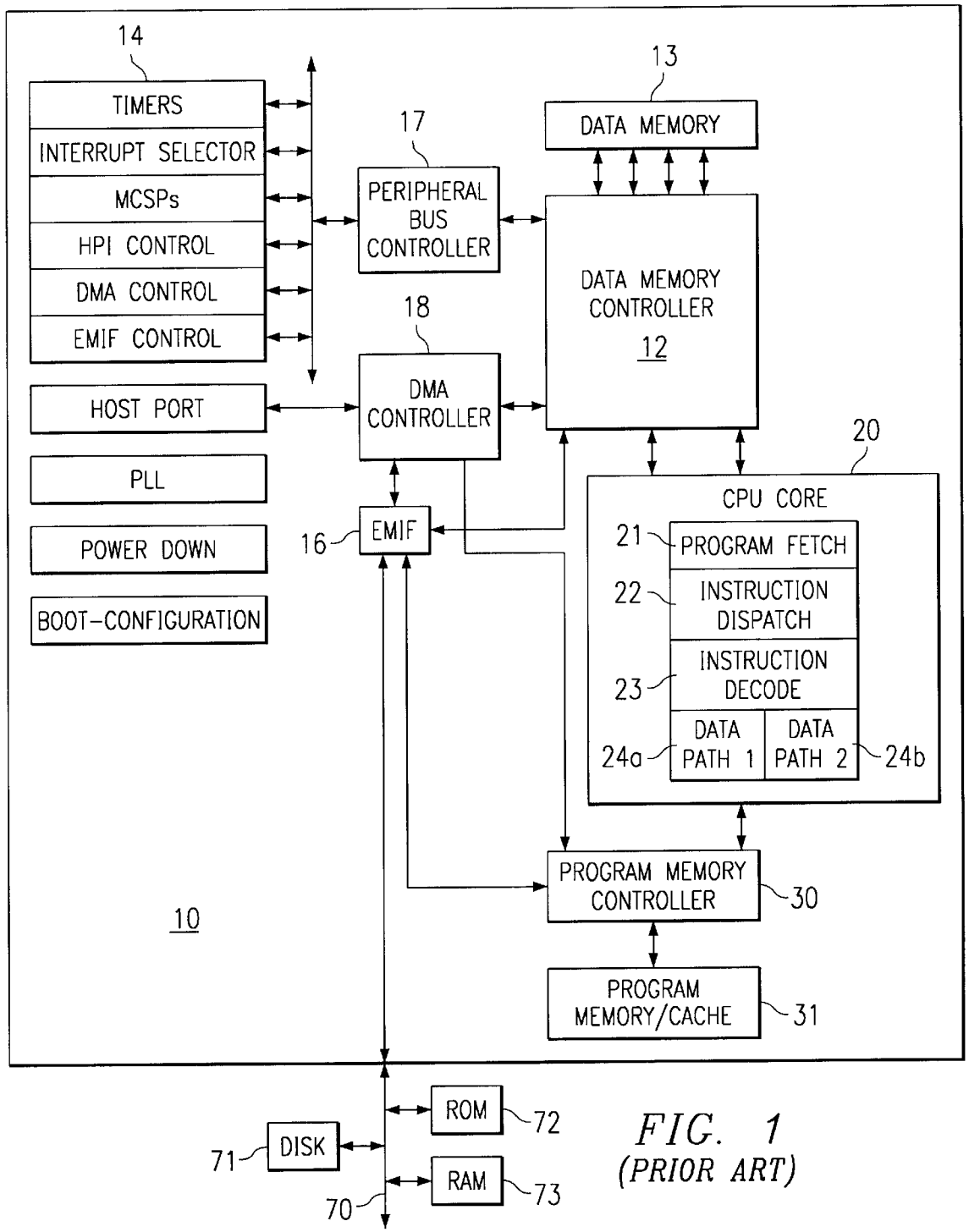
FIG. 1 is a block diagram depicting the execution units and registers of a multiple-execution unit processor, such as the Texas Instruments C6x microprocessor on which a preferred embodiment of the current invention is operable to execute.

A block diagram of a C6x processor connected to several external data systems is shown in FIG. 1. Processor 10 comprises a CPU core 20 in communication with program memory controller 30 and data memory controller 12. Other significant blocks of the processor include peripherals 14, a peripheral bus controller 17, and a DMA controller 18.

Processor 10 is configured such that CPU core 20 need not be concerned with whether data and instructions requested from memory controllers 12 and 30 actually reside on-chip or off-chip. If requested data resides on chip, controller 12 or 30 will retrieve the data from respective on-chip data memory 13 or program memory/cache 31. If the requested data does not reside on-chip, these units request the data from external memory interface (EMIF) 16. EMIF 16 communicates with external data bus 70, which may be connected to external data storage units such as a disk 71, ROM 72, or RAM 73. External data bus 70 is 32 bits wide.

Figure 2A:
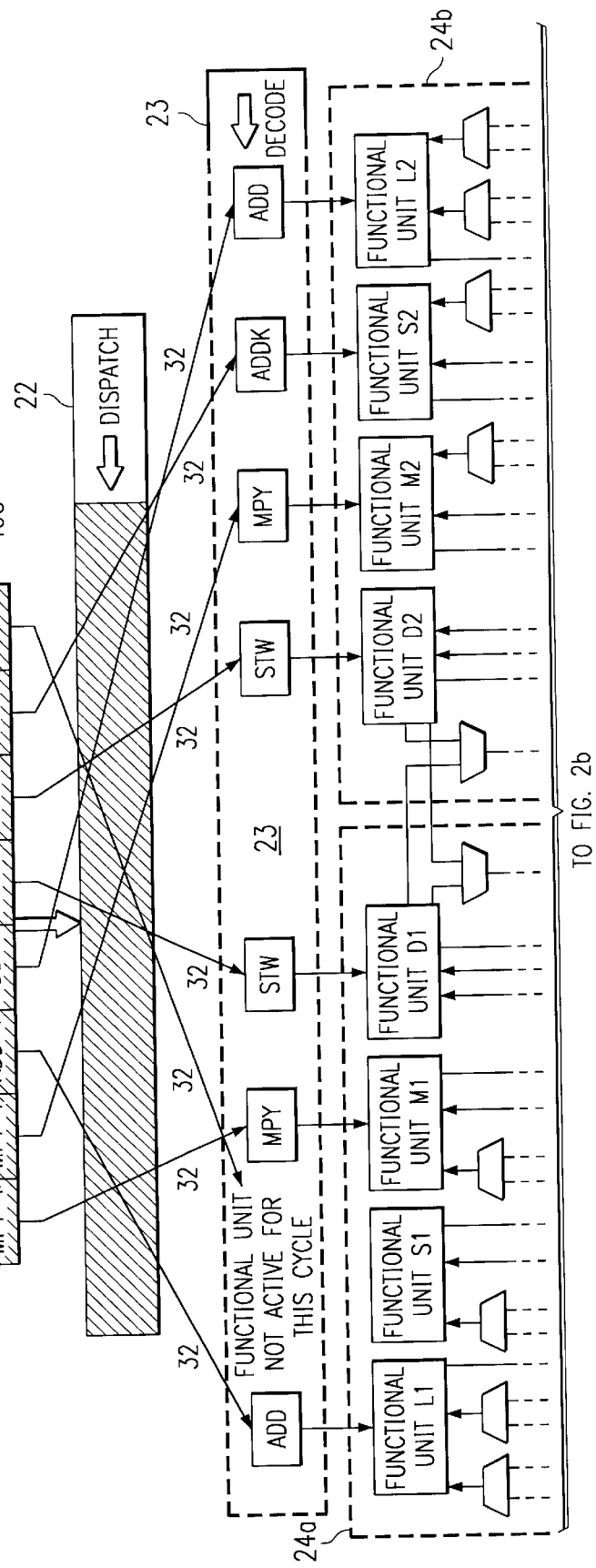
FIGS. 2a and 2b illustrate in a more detailed block diagram form, the flow of fetch packets as received from program memory 30 through the stages of fetch 21, dispatch 22, decode 23, and the two data paths 1 and 2, 24a and 24b.
Figure 2B:
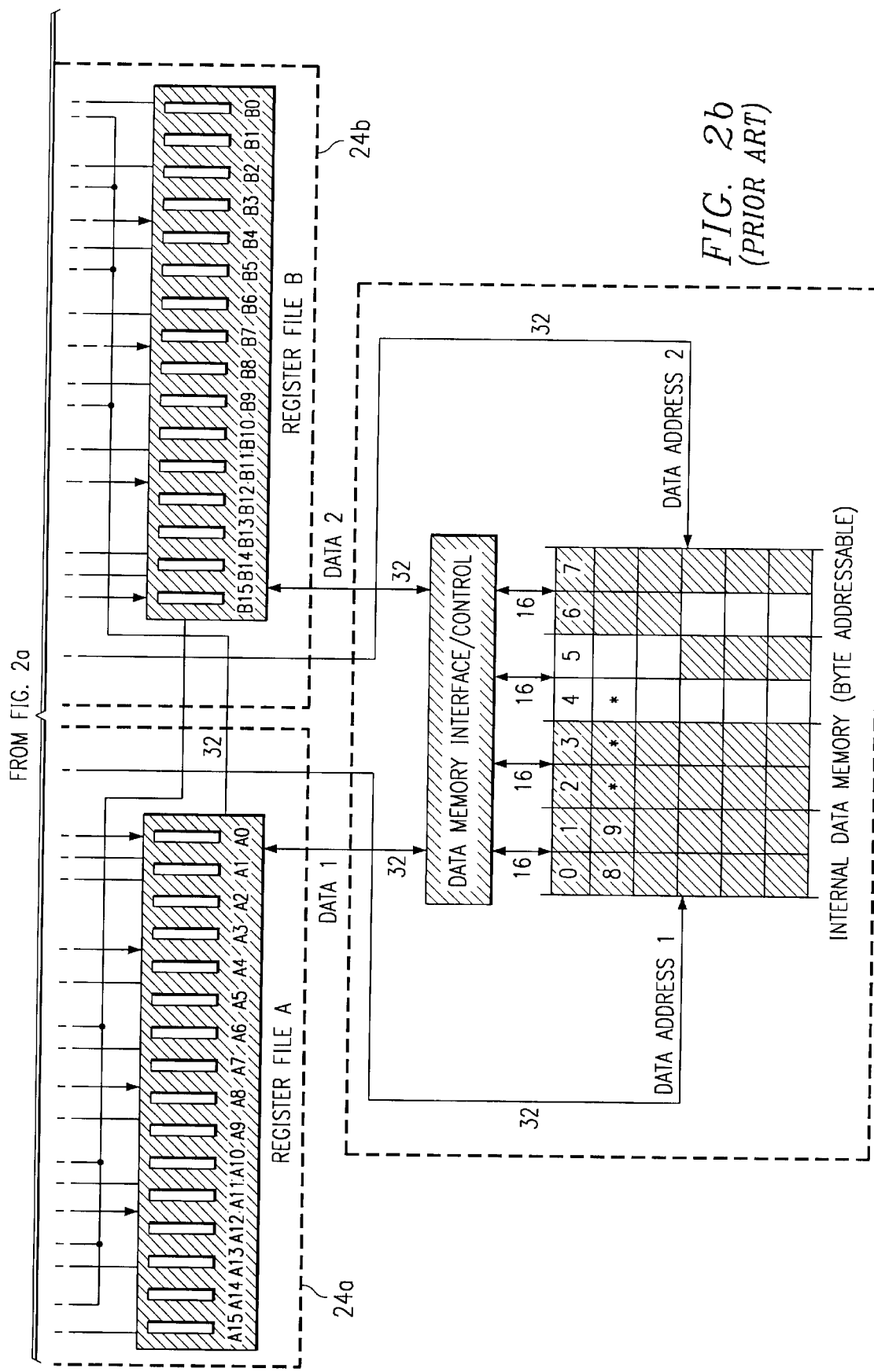
Figure 2C:
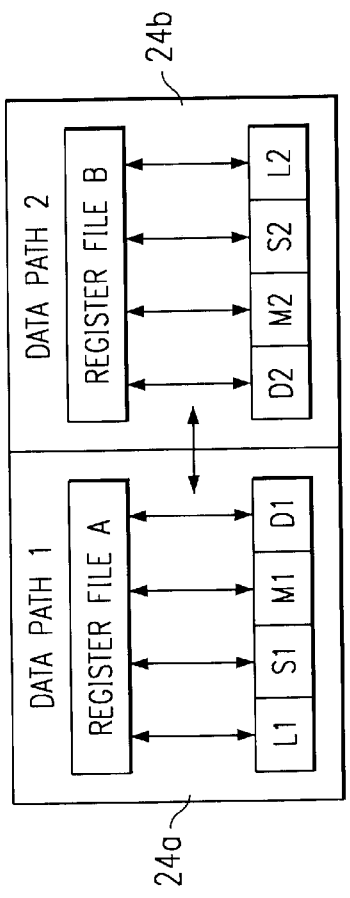
FIG. 2c illustrates in detail the datapaths 1, 24a, and 2, 24b of FIGS. 1, 2a, and 2b.

CPU core 20 includes two generally similar data paths 24a and 24b, as shown in FIG. 1 and detailed in FIGS. 2a, 2b and 2c. The first path includes a shared multiport register file A and four execution units, including an arithmetic and load/store unit D1, an arithmetic and shifter unit S1, a multiplier M1, and an arithmetic unit L1. The second path includes multiport register file B and execution units arithmetic unit L2, shifter unit S2, multiplier M2, and load/store unit D2. Capability (although limited) exists for sharing data across these two data paths.

Because CPU core 20 contains eight execution units, instruction handling is an important function of CPU core 20. Groups of instructions, 256 bits wide, are requested by program fetch 21 and received from program memory controller 30 as fetch packets, i.e. 100, 200, 300, 400, where each fetch packet is 32 bits wide. Instruction dispatch 22 distributes instructions from fetch packets among the execution units as execute packets, forwarding the "ADD" instruction to the arithmetic unit, L1 or the arithmetic unit L2, the "MPY" instruction to either Multiplier unit M1 or M2, the "ADDK" instruction to either arithmetic and shifter units S1 or S2 and the "STW" instruction to either arithmetic and load/store units, D1 and D2. Subsequent to instruction dispatch 22, instruction decode 23 decodes the instructions, prior to application to the respective execute unit.

Figure 3:
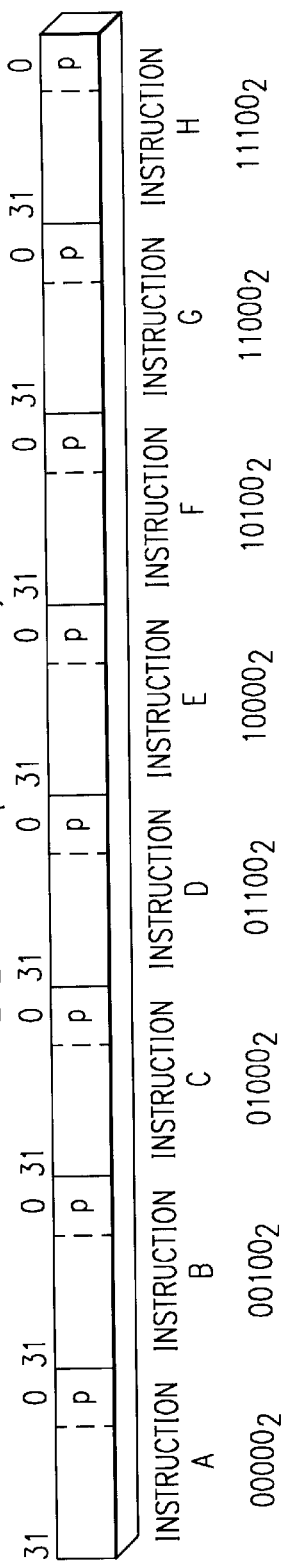
FIG. 3 illustrates the configuration of an 8 instruction wide fetch packet of FIG. 2.

In the preferred embodiment, a fetch packet has a fixed length of eight instructions, as shown in FIG. 3. The execution grouping of the fetch packet is specified by the p-bit, bit zero, of each instruction. Fetch packets are eight-word aligned in program memory.

The p-bit controls the parallel execution of instructions. The p-bits are scanned from left to right (lower to higher address) by instruction dispatch 22. If the p-bit of instruction i is 1, then instruction i+1 is to be executed in parallel with instruction i, i.e., in the same execute packet. Thus an execute packet may contain from one to eight instructions, and a fetch packet may contain from one to eight execute packets, depending on the size of the execute packets. All instructions in an execute packet must utilize a unique execution unit. An execute packet also cannot cross an eight-word boundary. Thus, the last p-bit in a fetch packet is always set to 0, and each fetch packet starts with a new execute packet.

Because of this variable execute packet length and fixed fetch packet length, on-chip program memory 31 in the preferred embodiment is aligned by fetch packets. If an instruction that resides in the middle of a fetch packet is requested by the CPU, the entire fetch packet is retrieved, but all instructions at lower addresses are ignored (even if they would have otherwise operated in parallel with the requested instruction).

Figures 4A, 4B:
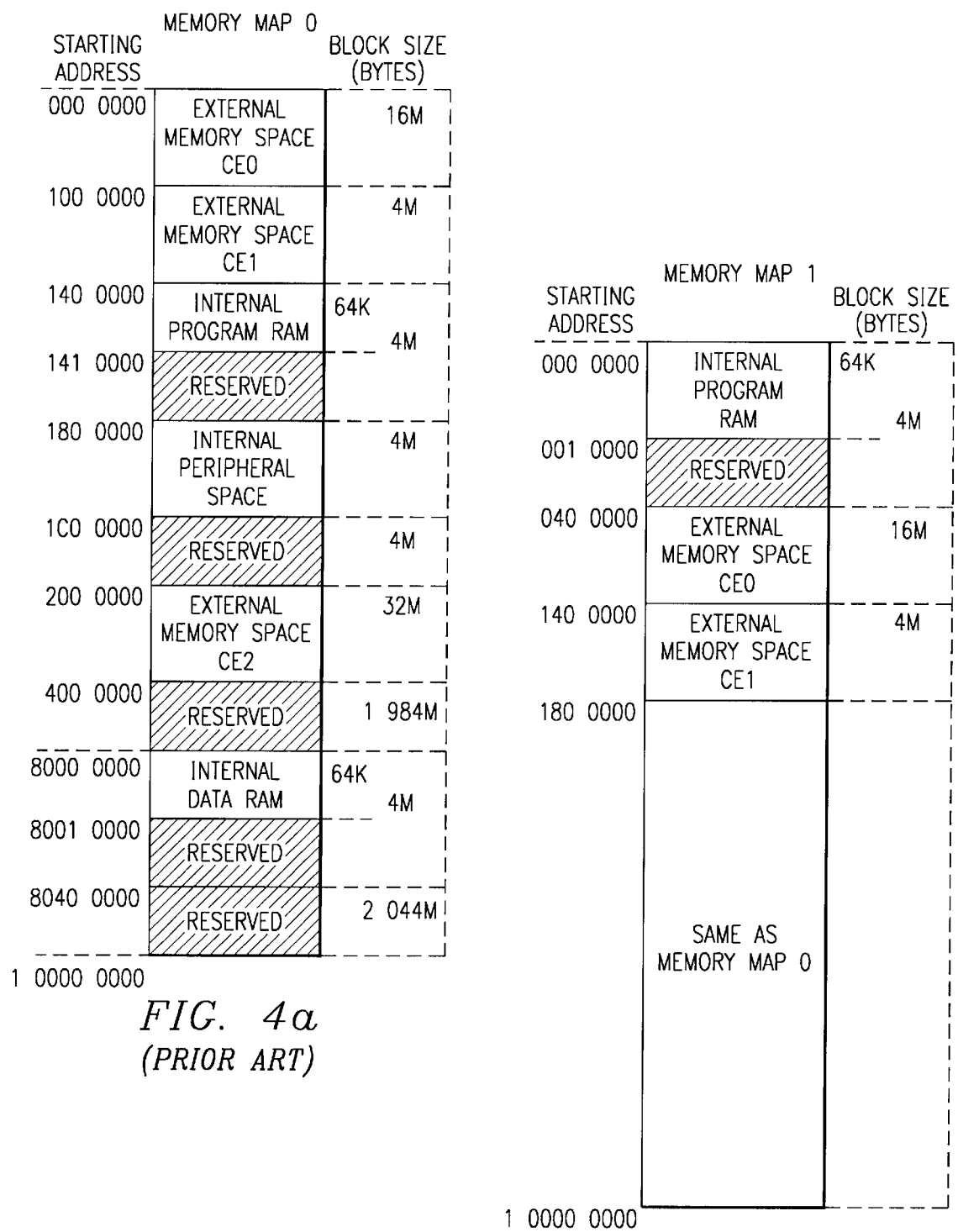
FIG. 4 illustrates the physically addressable on-chip address space of the C6x processor in memory map mode.

The physically addressable address space of the C6x processor is 4 Gbytes. On-chip program memory 31 has a size of 64K bytes. However, each instruction requires four bytes, and each fetch packet contains eight instructions, such that on-chip program memory 31 is arranged as 2K frames, each frame holding one fetch packet of 32 bytes, or 256 bits, in length. In memory map mode, the 64K bytes of on-chip memory may be selected to reside at a contiguous block of memory in address space starting at address 140 0000, as shown in FIG. 4A, or at a starting address of 000 0000, as shown in FIG. 4B.

FIG. 5A illustrates the pipeline stages of the C6000 microprocessor, as a fetch packet, comprising 8 instructions, is processed through the hardware pipeline. FIG. 5B is a chart which illustrates the processing phases of an instruction execution pipeline in the C6000 microprocessor of FIG. 1. Each phase corresponds roughly to a clock cycle of a system clock. For example, if microprocessor 1 is being operated at 200 MHz, then each phase is nominally 5 Ns. However, in a phase where data is expected from a memory or peripheral, such as RAM 70, the pipeline will stall if the data is not ready when expected. When stalled, a given pipeline phase will exist for a number of system clock cycles.

In FIG. 5B, the first phase of processing an instruction is to generate the program address in phase PG. This is done by loading a program fetch counter PFC which is located in program fetch 21. During the second instruction processing phase PS, an address of an instruction fetch packet is sent to program memory 31 via a program address bus PADDR. The third phase PW is a wait phase to allow for access time in memory 31. During the fourth phase PR, a program fetch packet is available from program memory 31 via data bus PDATA_I. During the fifth processing phase DP, instruction parallelism is detected and instructions that can be executed in parallel are dispatched, one execute packet/clock cycle, to the appropriate functional units. There is also a dispatch buffer at the DP processing phase within which 8 instructions reside awaiting dispatch to the decode phase DC. Each group of 8 instructions contains 1–8 execute packets. One execute packet is sent to DC each clock cycle. The next fetch packet is available from memory after all execute packets are sent. This aspect of pipeline operation will be described in more detail in later paragraphs. During the sixth processing phase DC, executable instructions are decoded and control signals are generated to control the various data paths and functional units. There are 8 individual decode units for each of the 8 functional units or one decode unit for each functional unit.

FIG. 5C is a chart which illustrates the execution phases of the instruction execution pipeline in the C6x microprocessor of FIG. 1. During the first execution phase E1, single cycle instructions, referred to as "ISC", and branch instructions, referred to as "BR", are completed. A designated execution unit performs the operations indicated in FIG. 5C as directed by control circuitry. During the second execution phase E2, the following types of instructions are completed by designated execution units under control of control circuitry: integer multiply (IMPY), program store instructions (STP), and data store instructions (STD). During the third execution phase E3, execution of load data instructions (LD) continues by latching data from the data memory system (DMS), as indicated. During execution phase E4, the data latched in E3 is transferred to a data input register DDATA_I in execution unit D1 or D2. During execution phase E5, the LD instruction is completed by manipulating the data in register DDATA_I and writing the manipulated data to a specified register in register file A or B.

FIG. 6 illustrates the Hardware Pipeline, comprised of the above-detailed phases, PG, PS, PW, PR, DP, DC and E1, for the following sequence of 5 instructions, A, B, C, D, and E, executed serially. As is shown, instructions A, B, C, D and E progress through the processing stages, a clock cycle at a time until every instruction, with instruction E being the last, has reached the execute or E1 stage of the Hardware Pipeline.

FIG. 7 illustrates the same 5 instructions, A, B, C, D and E executed in a single cycle loop with 20 iterations with serial execution, no parallelism and no software pipelining. This illustration is simply a cycle view of the total loop execution. Subscripts, 1, 2, 3, . . . 20 represent the particular loop iteration 1, 2, 3 . . . 20. For example, during the first five clock cycles shown, the first iteration of the loop has executed or has reached the E1 phase of processing. Likewise, from clock cycle 95 to clock cycle 99, the 20th iteration of the loop of instructions A, B, C, D and E executes or reaches the E1 phase of processing. This loop takes 5×20 or 100 clock cycles to execute.

FIG. 8 illustrates the same 5 instructions, A. B. C, D and E, executed in a single cycle loop with 20 iterations with software pipelining implemented. The time to execute each iteration of the loop of instructions A, B, C D and E, from start to finish is 5 cycles. In Software Pipelining, a new iteration of the loop is initiated and finished every one clock cycle. Therefore, during the second clock cycle, for example, the second iteration of the loop has already begun, A2, B2, C2, D2, E2, before the first iteration of the loop A1 has completed execution. The loop is defined in the code as shown, with the number of iterations the loop is to execute, defined in the "Loop" instruction. As shown in FIG. 8, the loop of instructions A, B, C, D and E takes a total of 24 clock cycles to execute. The first 4 clock cycles the loop prolog is defined. The loop prolog, as defined in previous paragraphs, builds the loop kernel. As discussed previously, this loop prolog can become prohibitively long and presents itself as one of the problems associated with Software Pipelining. On cycle 0, instruction A1 executes, on cycle 1, instructions B1 and A2 execute, on cycle 2, instructions C1, B2 and A3 execute, etc. such that until the entire kernel is built, many clock cycles are wasted prior to the software pipeline reaching stead-state operation. During clock cycles 4–19, the loop kernel consisting of every instruction of the loop, A, B, C, D and E, albeit different iterations, executes 16 times or 16 iterations. For example, on clock cycle 4, the 5th iteration of instruction A executes at the same time the 4th iteration of instruction B executes at the same time that the 3rd iteration of instruction C executes, at the same time that the 2nd iteration of the D instruction executes at the same time that the 1st iteration of instruction E executes. Because the "Loop" instruction defined the number of iterations as 20, the loop epilog follows the loop kernel and executes during cycles 20–23, thereby completing, along with the loop prolog, the additional 4 iterations of the loop.

FIG. 9 illustrates instructions A–P in a loop executed in a three cycle loop with 20 iterations with software pipelining implemented. As is shown, instructions B and C can execute in parallel, which means that they use different functional units to execute. Likewise, instructions D and E, F G and H, K and L, M and N and O and P also can execute in parallel, thereby increasing the parallelism of the system. As is also shown, instructions A1, 131, C1, D1, and E1 make up the first 3 cycle loop and execute on cycles 0–3, but because there are instructions F–P still remaining in the loop, instead of starting with instructions A2, B2 etc. on the 4th cycle, cycle 3 starts execution of instructions F1, G1 and H1 and also executes the second iteration of instruction A, A2. The prolog continues to build the kernel, during cycles 0–5, until every instruction of the loop consisting of the instructions A–P is executing simultaneously within the three cycle loop as illustrated during cycles 6–8. The instructions of the epilog execute during 4 cycles 60–65. This loop takes a total of 66 cycles to execute. There are 6 cycles for the prolog, 18×3 or 54 cycles for the loop and 6 cycles for the epilog.

FIG. 10 illustrates the 3 cycle loop kernel of FIG. 9, with instructions A–P mapped to hardware functional units. As shown, on the first loop cycle, instructions A, F, G, H, K and L execute simultaneously on different functional units. Therefore, during the above FIG. 9, it makes sense that during cycle 3 not only do the first iteration of instructions F, F1, G, G1 and H, H1 execute, but the second iteration of instruction A, A2 executes as well, thereby completing execution of the second iteration of instruction A, which according to the "Loop" instruction called out in the code, has 20 iterations to complete and thereby making the system more efficient. This efficiency is due in part to the software pipelining and in part to the fact that the C6x microprocessor comprises 8 functional units which can be executed in parallel per clock cycle. Likewise, on the second loop cycle instructions B, C, I, M and N execute in parallel, albeit also on different functional units from each other. And on the third and final loop cycle (remember, the "Loop" instruction called out a three cycle loop) instructions D, E, J, O and P execute in parallel, due to their particular functional unit needs.

FIG. 11 illustrates the C6000 coded instruction sequence of instructions AP executed in a three cycle loop with 20 iterations with software pipelining. As described in the previous paragraphs, the code size can become prohibitive, in view of the complexity and depth of the loop. As shown, the code, like the execution schedule, must build up to the kernel or steady-state operation. Therefore, as the execution schedule of FIG. 9 illustrates, the code defines, the first iteration of instruction A to execute, then the next clock cycle, the first iteration of instructions B and C execute in parallel, then the next clock cycle, the first iteration of instructions D and E execute in parallel, then because a new loop cycle is beginning, the first iteration of instructions F, G and H execute along with the second iteration of instruction A, A2. As mentioned previously, this parallelism is attributed to not only the software pipeline but also to the hardware of the C6x microprocessor comprising 8 different functional units which can be executed in parallel, per clock cycle. By the seventh clock cycle, the loop kernel has begun, and shows the first of the loop cycles, wherein the first instruction K executes in parallel with the first iteration of instruction L, the second iteration of instruction F1, the second iteration of instruction G, the second iteration of instruction H and the third iteration of instruction A. Once the loop kernel has begun, the instructions iterate the number of times defined in the "Loop" instruction, every three clock cycles(as the loop was initially defined as a three cycle loop in the "Loop" instruction). The kernel takes 18 ×3 (iterations A3 to A-20 are executed in during the first loop cycle, during the first portion of the three cycle loop) clock cycles to execute. Following the loop kernel, the loop epilog completes those portions of the unfinished 3 cycle loops from above in the loop prolog, to total the entire 20 iterations of the three cycle loops of the loop comprised of instructions A–P. This loop requires a total of 48 instructions to execute.

FIG. 12 illustrates the dispatch of instructions A–P from the DP stage of the C6000 DP/DC stages of the C6000 pipeline. Therefore, using the same example illustrated in the above FIGS. 9–11, the dispatch buffer 222 of the dispatch stage of the hardware pipeline of the C6x microprocessor, DP 22, and the decode of the decode stage of the hardware pipeline C6x, DC, 23, are illustrated (also illustrated in FIG. 2). Where FIG. 9 illustrated the execution schedule of the instructions A–P in the 3 cycle loops, FIG. 10 illustrated on which functional units the instructions AP were executing during the 3 cycles of the loop kernel, and FIG. 11 illustrated the C6x code necessary to code the 20 iterations of the software pipelined 3 cycle loop of instructions A–P, FIG. 12 illustrates the dispatching of instructions A–P from the dispatch buffer 222 of the dispatch stage DP 22, to the decode units DC 23, of the individual functional units, per clock cycle. Because dispatch buffer 222 can store up to 8 instructions for dispatch, instructions A, B, C, D, E, F, G and H are stored in the dispatch buffer 222 at the start of clock cycle −2. During clock cycle −2, instruction A, the first execute packet of the first fetch packet, is dispatched to the decode unit 23 of functional unit M1, a multiplier. On the next clock cycle, cycle −1, instructions B and C, the second execute packet of the first fetch packet, are dispatched to the decode units 23 of functional units S2 and M2, store and multiplier units respectively. During clock cycle 0, instructions D and E, the third execute packet of the first fetch packet, are dispatched from the dispatch buffer 222, to the decode unit 23 of functional units M1 and M2, the two multipliers. On clock cycle 1, not only are instructions F, G and H, the fourth and final execute packet of the first fetch packet, dispatched to the decode units 23 of functional units L1, S1 and S2, but also the dispatch buffer 222 is loaded with the second fetch packet, a new set of 8 instructions, I, J, K, L, M, N O and P, such that on the next clock cycle, cycle 2, instruction I can be dispatched to the decode unit 23 of functional unit L2, without having to wait for instruction I to be loaded into dispatch buffer 222. The dispatching of the various execute packets from the second fetch packet then progresses as stated with the previous fetch packet until every instruction A–P have been dispatched to the appropriate decode units 23 of the functional units. This Figure is illustrating only the first iteration of loop A–P.

FIG. 13 illustrates the C6000 hardware pipeline, and the corresponding stages, filled with the same example (except one iteration instead of 20) of a software pipelined loop of instructions A–P executed in a three cycle loop illustrated in FIGS. 9–12. The stages of the C6x microprocessor hardware pipeline are described in detail with regard to FIGS. 5B and 5C. As is shown, the first fetch packet of instructions ABCDEFGH progresses through stages PG, PS, PW, PR and true to software pipelining philosophy, the second fetch packet of instructions IJKLMNOP begins progressing through the same stages PG, PS, PW, PR one clock cycle behind the first fetch packet. Once the first fetch packet reaches the dispatch stage 22 and are stored in the dispatch buffer 222 as illustrated in FIG. 12, the dispatch stage DP is stalled from retrieving and storing more fetch packets until all the execute packets from the first fetch packet have been dispatched to the decode units 23 associated with the particular functional unit on which the instruction will execute. Therefore, DP is stalled from cycle −1 through cycle 1 while execute packets, A, B and C, D and E, and F, G, and H are dispatched to the decode units 23 of the appropriate functional units and continue to progress through the execute stages, E1. As illustrated in FIG. 12, during cycle 1, while the execute packet comprised of instructions F, G and H is dispatched to the appropriate decode units 23, the next fetch packet of instructions IJKLIVINOP is stored in the dispatch buffer 222 of dispatch stage DP 22 for dispatch to the decode units 23 on the next clock cycle, cycle 2. Likewise as to the first fetch packet, while the second fetch packet is divided into execute packets of instructions which can be executed in parallel, no new fetch packets will be loaded into the dispatch buffer 222 of dispatch unit 22 (in other words, the DP stage of the hardware pipeline is stalled) until all execute packets from the second fetch packet have been dispatched to the particular decode units 23.

Figures 14, 15:
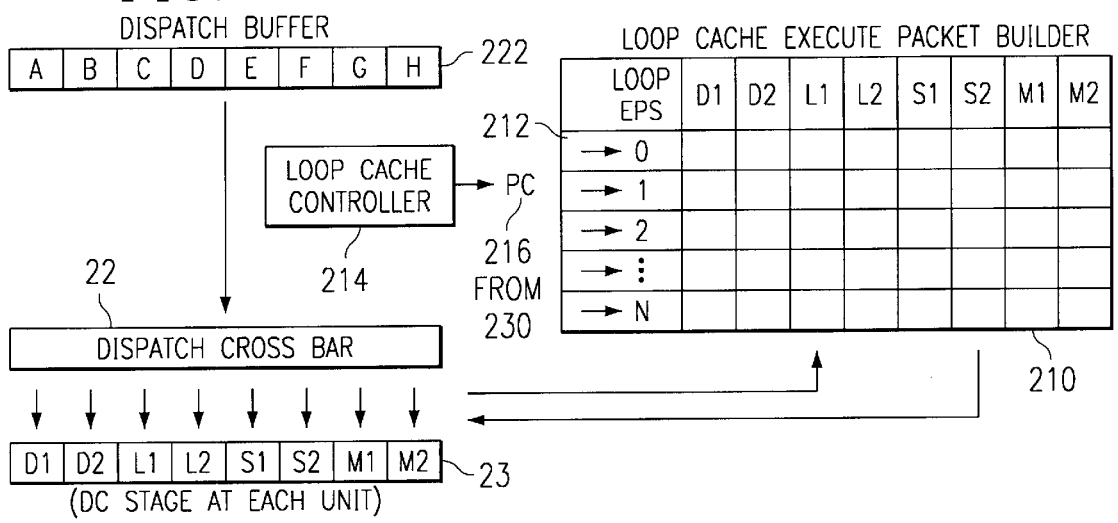
FIG. 14 illustrates the C6000 DP/DC stages with the Loop Cache Execute Packet Builder according to a preferred embodiment of the invention.
FIG. 15 illustrates the new instruction sequence of the same example (20 iterations of the 3 cycle loop of instructions A–P) executed on the C6000 implementing the Loop Cache Execute Packet Builder according to a preferred embodiment of the invention.

FIG. 14 illustrates the C6x microprocessor DP/DC stages with the Loop Cache Execute Packet Builder (LCEPB) 210 according to a preferred embodiment of the invention. In one aspect, the present invention provides a multiple execution unit microprocessor such as the C6x comprising an instruction pipeline 230, a loop cache memory 210 in communication with the instruction pipeline 230, and a loop cache controller 214 in communication with both the instruction pipeline 230 and the loop cache memory 210. The instruction loop cache memory 210 is capable of storing and retrieving up to N cycles of execution unit instructions for each execution unit. The loop cache memory 210 is capable of selectively issuing instructions to the execution units from the instruction pipeline 230 and from the loop cache memory 210. The loop cache controller 214 preferably enables the instruction loop cache memory 210 in response to a software command, and controls storage and retrieval of instructions from the loop cache memory 210. As is shown in FIG. 14, instructions that are dispatched from the dispatch buffer 222 of the dispatch unit 22 to the particular decode unit 23 are simultaneously stored in loop cache memory 210. Additionally, once the loop cache execute packets are built in LCEPB 210, while new instructions from the hardware pipeline 230 are being dispatched from the dispatch buffer 222 of the dispatch unit 22 to the appropriate decode units 23, previously stored instructions from within the loop cache 210 which can execute in parallel with those new instructions just dispatched to the decode units 23 are issued to the decode units 23 as well such that the hardware pipeline 230 executes the new instructions and the loop cache instructions simultaneously. The loop cache controller 214 preferably also detects exit conditions for the cached loop. It is also preferable that the loop cache controller 214 function uses the microprocessor program counter. The loop cache controller 214 may also stall and restart the instruction pipeline 230 of the microprocessor appropriately in response to loop caching commands.

FIG. 15 illustrates the new instruction sequence of the same example (20 iterations of the 3 cycle loop of instructions A–P) executed on the C6000 implementing the Loop Cache Execute Packet Builder according to a preferred embodiment of the invention. In contrast to the 48 instructions required to execute 20 iterations of a loop A–P as illustrated in FIG. 11, now only 17 instructions are needed, greatly reducing the code size as well as reducing the power required to perform load and stores from memory. As illustrated, the new "Loop" command is called out as "B_LOOP LOOP_LABEL, X, Y" where the "LOOP_LABEL" represents the label of the loop for identification purposes. The "X" portion of the "B_LOOP" instruction represents the number of cycles it will take from the "B_LOOP" instruction to complete the first branch or the number of cycles it will take to complete the first iteration of the loop. The "Y" portion of the "B_LOOP" instruction represents the size in cycles of the loop. As illustrated in the new "B LOOP" instruction example of FIG. 15, the label of the loop is "LoopNew", the loop of instructions from A–P will take 9 cycles to execute(this can also be more readily seen from FIG. 12 which illustrates the execute packets being dispatched from the dispatch buffer 222 to the decode units 23), and the loop is a 3 cycle loop. Only upon issuance of the "B-LOOP_LABEL, X, Y" does a 2 cycle delay occur which resets and clears the loop cache and all new instructions from DP 218.

As illustrated with more detail in FIGS. 16a–16f, once a software instruction has been received by loop cache controller 214 to shift into loop cache controller mode LCC, instructions dispatched via DP 222 are stored in loop cache memory 210 simultaneously via loop cache controller 214, and loop cache controller 214 also forwards those instructions from loop cache memory 210 to the DC phase 23 of instruction pipeline 230. The loop cache controller 214 also controls: 1) whether NOPs coming from DP are written or ignored; 2) which cache memory line DP results are written into; and 3) which cache memory line the DC stage reads from. In order to clear the cache prior to the first pass through the loop, the DP would have to write NOPs in the cache if there was no instruction executing on that cycle. After the first pass through, future NOPs do not write over the existing instructions in the cache.

The method according to a preferred embodiment comprises the steps of building a software pipelined loop kernel in the loop cache memory, stalling the instruction pipeline, executing at least one iteration of the loop kernel using the kernel instructions in the loop cache memory, detecting a loop exit condition, and resuming the instruction pipeline. Preferably, instructions may be issued from the loop cache memory while the loop kernel is being built, thus allowing reductions in code size.

FIGS. 16a–16f illustrates a walk-through example of the operation of the Loop Cache Execute Packet Builder as viewed with regards the DP/DC stages of C6000. The invention will now be described using embodiments that operate on an eight execution unit processor such as the one depicted in FIG. 1, e.g., the TMS320C6xx processor. FIGS. 16a–16f illustrate how the "Loop Cache Execute Packet Builder" 210 (LC) builds the loop cache execute packet i.e., 212, as the hardware pipeline is filling. PC 216 represents the instruction address of the first instruction in the fetch packet that is in the E1 pipeline phase. An instruction in the E1 pipeline phase means that the instruction has reached the dispatch buffer at the dispatch phase DP in the pipeline and has just been dispatched to the decode unit DC which is particular to each execution unit, the DC/E1 unit pair on which the instruction will execute. PFC is the instruction address of the next fetch packet to be obtained from memory. PFC is either incremented to the next fetch packet each clock cycle (unless the pipeline is stalled) or changed to the branch target of a branch instruction that is in the E1 phase. The operation of the loop cache execute packet builder 210 should not change the value or the timing of the counters which are performing the aforementioned incrementing. Execution units D1, D2, L1, L2, S1, S2, M1 and M2 are the same execution units mentioned in previous paragraphs and run along the top of the loop cache execute packet builder.

FIG. 16a illustrates the Loop Cache and the decode units upon issuance of instruction A to both the C6000 CPU's M1 unit decode unit and to PC0 of the LCEPB during cycle –2. Before cycle –2 (of the example provided in FIG. 9), nothing has been loaded into the LCEPB yet and the Dispatch Buffer 222 is full with instructions A–H. After the special "B-LOOP" instruction has been received by the loop cache controller, LCC 214, during cycle –2, the first execution packet from the fetch packet entering the E1 pipeline phase, PC 216, in this example, the execution packet of instruction A, is dispatched from the dispatch buffer 222 to the CPU's M1 unit decode unit 23 and also sent to the LCEPB 210 in the location associated with the particular type of execution unit on which the instruction will be executing, i.e. M1 per this example. At the beginning of cycle –1, instruction A resides in the execution packet EP0 of LCEPB and the LCEPB PC points to EP1. In addition, as better illustrated in FIG. 13, while the execute packets making up the fetch packet residing in the dispatch buffer 222 are issued an execute packet/clock cycle to the respective decode units 23, until all the execute packets from the fetch packet residing in the dispatch buffer 222 are issued to the respective decode units 23, the pipeline phases prior to the DP phase 218 of the hardware pipeline are stalled. Therefore, at the beginning of cycle –1, the pipeline phases before the DP phase 218 of the hardware pipeline are in a stall and will continue to be in a stall until the beginning of cycle 2, when all the execute packets from dispatch buffer 222 have been issued to their respective decode units 23 and a new fetch packet is finally fetched from the hardware pipeline 230 during cycle 1.

FIG. 16b illustrates the Loop Cache and the decode units upon issuance of the second execute packet of the first fetch packet comprised of instructions B and C to both the C6000 CPU's S2 and M2 decode units, respectively, and to EP1 of the LCEPB during cycle –1. Therefore, at the beginning of cycle 0, instruction A resides in EP0 in the LCEPB 210, instructions B and C have been sent to the DC unit 23 of execution units S2 and M2, respectively, and now instructions B and C also reside in EP1 of the LCEPB 210 in the location associated with the particular type of execution unit on which the instruction will be executing, i.e. S2 and M2 respectively. Also at the beginning of cycle 0, PC points to EP2. As previously described in detail, the pipeline phases before the DP phase 218 of the hardware pipeline are stalled at the beginning of cycle 0.

FIG. 16c illustrates the Loop Cache and the decode units upon issuance of the third execute packet of the first fetch packet comprised of instructions D and E to both the C6000 CPU's M1 and M2 decode units, respectively, and to EP2 of the LCEPB during cycle 0. Therefore, at the beginning of cycle 1, instruction A resides in EP0 of LCEPB 210, instructions Band C reside in EP1 of the LCEPB 210 and now instructions D and E reside in EP2 of the LCEPB 210 in the location associated with the particular type of execution unit on which the instruction will be executing, i.e. M1 and M2 respectively. Because the "Loop" was specified to have three cycles (B__Loop LoopNew, 9,3), at the beginning of cycle 1, the PC moves from EP2 back to EP0. As previously described in detail, the pipeline phases before the DP phase 218 of the hardware pipeline are stalled at the beginning of cycle 1.

FIG. 16d illustrates the Loop Cache and the decode units upon issuance of the fourth and final execute packet of the first fetch packet of dispatch buffer 222 comprised of instructions FGH to the C6000 CPU's L2, S1 and S2 decode units, respectively, and to EP0 of the LCEPB and issuance of instruction A from EP0 of the LCEPB to the C6000 CPU's M1 decode unit, during cycle 1. The PC point to EP1 at the beginning of cycle 2. Because instructions FG and H form the last execute packet of the first fetch packet previously stored in dispatch buffer 222, the hardware pipeline phases prior to DP 218 comes out of the stall previously in, and dispatch buffer 222 is loaded with the next or second fetch packet comprised of instructions I, J, K, L, M, N, O and P, from the hardware pipeline, which may comprise from 1 to 8 execute packets depending upon the parallel execution of each other and each others dependencies.

FIGS. 16e and 16f skip many of the steps, through the end of cycle 6 and the beginning of cycle 7, where execute packets comprised of instructions I(first execute packet of second fetch packet), J(second execute packet of second fetch packet,) K and L(third execute packet of second fetch packet), and M and N(fourth execute packet of second fetch packet) issue from dispatch buffer 222 to their respective decode units 23 as well as to the different EP1, EP2, EP0, EP1, respectively, of the LCEPB 210 in the location associated with the particular type of execution unit on which the instruction will be executing, i.e. L2, S1, D1 and D2, and D1 and L1 respectively. These execute packets process through the LCEPB 210 as the previous execute packets did. Of course, as previously detailed, because the dispatch buffer 222 of the DP phase of hardware pipeline 230 can only store up to 8 instructions and only one execute packet is issued from the dispatch buffer 222 a clock cycle, the pipeline phases before the DP phase 218 of hardware pipeline 230 are stalled during clock cycles 2 through the end of cycle 7 as the last execute packet is issued from the dispatch buffer 222 of the DP phase of hardware pipeline 230 to the particular decode unit 23 of the execution unit on which the instruction(s) will be executing. At the end of clock cycle 6, the beginning of clock cycle 7, PC points to EP2.

FIG. 16e illustrates the Loop Cache and the decode units upon issuance of the fifth and final execute packet of the second fetch packet, previously stored in dispatch buffer 222, comprised of instructions O and P to the C6000 CPU's D2 and L1 decode units, respectively, and to EP2 of the LCEPB and issuance of instructions JDE from EP2 of the LCEPB to the C6000 CPU's S1, M1 and M2 decode units, respectively, during clock cycle 7. Because the number of clock cycles since the first execute packet was stored in the LCEPB 210 is now 9, and the original "Loop" instruction (B Loop LoopNew, 9,3) defined the number of clock cycles for the "Loop" to completely iterate once as 9, future dispatch from dispatch buffer 222 of DP stage 218 of hardware pipeline 230 is stalled until loop cache counter (LCC) 214 equals "zero" and all instructions within LCEPB 210 have been issued to the respective decode/execution units 23 "CNTR" times, i.e. 20 times per this example, at which point, dispatch buffer 222 of the DP phase of hardware pipeline 230, will contain instructions Q, R, S, T U, V, W and X and normal operation continues with the LCEPB 210 flushed and ready for the next loop.

FIG. 16f illustrates the above paragraph, wherein LCEPB 210 and the decode units 23 upon issuance of instructions KLFGHA from EP0 of the LCEPB to the C6000 CPU's D1, D2, L2, S1, S2 and M1 decode units, respectively, while the dispatch of instructions from the DP phase 218 of the C6000 to the respective decode units 23 is stalled until "cntr"=0. Once the first branch instruction of the software pipelined loop is taken (thus all loop instructions have been loaded in the loop cache and the last execute packet from the dispatch buffer 222 has been issued to the particular decode unit 23), the same signal that the DP stage 218 sends to the fetch pipeline could be used by the LCC 214 to stall the fetch pipeline stages. The LCEPB 210 illustrated in FIG. 16f comprises those instructions which will exist in the LCEPB 210 for the beginning of cycles 8, 11 . . . 56. In the remaining cycles from clock cycle 57–63, the epilog will effectively execute as each instruction completes executing "CNTR" times, or 20 times in this example.

Only upon completion of the loop in the LCEPB 210 such that all the elements of the loop are executing simultaneously, albeit from different iterations of the loop, does the LCC 214 send a conditional instruction to stall the fetch pipeline stages while the loop is executing the predesignated number of iterations. Only upon issuance of the "B-LOOP LABEL, X, Y" does a 2 cycle delay occur which resets and clears the loop cache and all new instructions from DP 218 to prepare the LCEPB and the DP phase of the hardware pipeline for the next loop. As previously described, in the "B-LOOP LABEL, X, Y" instruction, the "LOOP LABEL" represents the label of the loop for identification purposes. The "X" portion of the "B-LOOP" instruction represents the number of cycles it will take from the "BLOOP" instruction to complete the first branch or the number of cycles it will take to complete the first iteration of the loop. The "Y" portion of the "B-LOOP" instruction represents the size in cycles of the loop. As previously stated, once the first branch instruction of the software pipelined loop is taken (thus all loop instructions have been loaded in the loop cache), the same signal that DP 218 sends to the fetch pipeline could be used by the LCC 214 to stall the fetch pipeline stages Although the invention has been described herein with reference to a specific processor, it is recognized that one of ordinary skill can readily adapt the described embodiments to operate on other multiple execution unit processors. Likewise, the use of the dot product is illustrative and not limiting—it is recognized that the invention may be readily practiced with software pipelined loops generally. And although the preferred embodiments have been described with reference to several specific methods of building a software pipelined loop kernel on the fly and then stalling the pipeline to execute the iterations of the loop kernel, one of ordinary skill in the art may readily substitute other similar methods that are applicable to a specific microprocessor in an embodiment of the invention. Other obvious modifications will be apparent to those of ordinary skill in the art upon reading this disclosure; such are intended to fall within the scope of the present invention.

What is claimed is:

1. The method of operating a multiple execution unit processor having an instruction pipeline and a loop cache memory capable of storing N execute packets, wherein N is an integer greater than zero, said method comprising the steps of:
   providing a loop cache memory for storing N execute packets wherein N is an integer greater than zero;
   building a software pipelined loop kernel of length n execute packets in said loop cache memory, wherein n is an integer greater than 0 and less than or equal to N;
   stalling said instruction pipeline;
   executing at least one iteration of said software pipelined loop kernel by issuing for each iteration said software pipelined loop kernel of n execute packets in said loop cache memory;
   detecting a loop exit condition; and
   resuming said instruction pipeline;
   wherein said building step comprises the steps of:
      signaling said processor via an instruction to begin building a software pipelined loop of length n clock cycles in said loop cache memory;
      inputting m clock cycles of loop building instructions to said processor, wherein m is greater than n and at each clock cycle m, one or more instructions are input;
      accumulating each of said m clock cycles of loop building instructions into said loop cache memory at one of said an execute packet locations; and
      wherein said accumulating step comprises the steps of:
         storing the first of said m clock cycles of loop-building instructions into the first of said n execute packet locations;
         calculating a new execute packet location by incrementing the execute packet location by one, and resetting the execute packet location to said first execute packet location if the incremented location is past the last of said n execute packet locations;
         storing the second of said m clock cycles of loop-building instructions into said new execute packet location; and
         repeating said calculating a new execute packet location step and said storing a clock cycle of loop-building instructions step until each of said m clock cycles of loop-building instructions has been stored in said loop cache memory.

2. The method of claim 1, wherein the contents of each of said n execute packet locations is cleared at the time of or before the first of said storing steps that affects that particular execute packet location.

3. The method of claim 1, wherein during said building step, instructions issued to said execution units comprise instructions accumulated in said loop cache memory.

4. The method of operating a multiple execution unit processor having an instruction pipeline and a loop cache memory capable of storing N execute packets, wherein N is an integer greater than zero, said method comprising the steps of:

provided a loop cache memory for storing N execute packets wherein N is an integer greater than zero;

building a software pipelined loop kernel of length n execute packets in said loop cache memory, wherein n is an integer greater than 0 and less than or equal to N;

stalling said instruction pipeline;

executing at least one iteration of said software pipelined loop kernel by issuing for each iteration said software pipelined loop kernel of n execute packets in said loop cache memory;

detecting a loop exit condition; and resuming said instruction pipeline;

wherein said building step comprises the steps of:

signaling said processor via an instruction to begin building a software pipelined loop of length n clock cycles in said loop cache memory;

inputting m clock cycles of loop building instructions to said processor, wherein m is greater than n and at each clock cycle m, one or more instructions are input;

accumulating each of said m clock cycles of loop building instructions into said loop cache memory at one of said n execute packet locations; and wherein during said building step, instructions issued to said execution units comprise a combination of one clock-cycle of loop-building instructions from said m clock cycles, along with any instructions from the loop cache memory execute packet in which said one clock-cycle of loop-building instructions will be stored, to the extent that said instructions from the loop cache memory execute packet will not be overwritten by the accumulation of said one clock-cycle of loop-building instructions into said execute packet.

5. A multiple execution unit processor comprising an instruction pipeline;

a loop cache memory in communication with said instruction pipeline, said loop cache memory capable of storing N execute packets of instructions, wherein N is an integer greater than zero; and a controller capable of selectively issuing instructions to said execution units from said instruction pipeline and from said N execute packets of said loop cache memory; wherein said controller has the capability to issue at least one instruction from said instruction pipeline to one of said execution units, and at least one instruction from said loop cache memory to another of said execution units, on the same clock cycle.

6. The processor of claim 5, wherein said controller accumulates instructions from said instruction pipeline into said loop cache memory in response to a software command.

7. The processor of claim 5, wherein said controller has the capability to issue instructions from said instruction pipeline to said execution units, while also accumulating said instructions into said loop cache memory.

8. The processor of claim 5, said controller having access to a loop size register that can be set by software command to contain the size of a software pipelined loop.

9. The processor of claim 8, wherein said controller uses a loop size value n stored in said loop size register to repetitively sequence through n execute packets stored in said loop cache memory.

* * * * *